United States Patent
Kong

(10) Patent No.: US 11,941,245 B2
(45) Date of Patent: Mar. 26, 2024

(54) INFORMATION PROCESSING METHOD, STORAGE MEDIUM, AND ELECTRONIC DEVICE

(71) Applicant: GUANGDONG OPPO MOBILE TELECOMMUNICATIONS CORP., LTD., Dongguan (CN)

(72) Inventor: Fanxiu Kong, Dongguan (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 0 days.

(21) Appl. No.: 18/088,537

(22) Filed: Dec. 24, 2022

(65) Prior Publication Data

US 2023/0139478 A1 May 4, 2023

Related U.S. Application Data

(63) Continuation of application No. PCT/CN2021/097290, filed on May 31, 2021.

(30) Foreign Application Priority Data

Jul. 3, 2020 (CN) .......................... 202010635302.1

(51) Int. Cl.
  *G06F 3/04886* (2022.01)
  *G06F 3/041* (2006.01)
  *G06F 3/04845* (2022.01)

(52) U.S. Cl.
  CPC ........ *G06F 3/04886* (2013.01); *G06F 3/0416* (2013.01); *G06F 3/04845* (2013.01)

(58) Field of Classification Search
  CPC ............. G06F 3/04886; G06F 3/04842; G06F 3/04847; G06F 3/04817; G06F 3/04845;
  (Continued)

(56) References Cited

U.S. PATENT DOCUMENTS

| 2010/0231536 A1 | 9/2010 | Chaudhri et al. |
| 2010/0231537 A1* | 9/2010 | Pisula .................... G11B 27/34 345/173 |

FOREIGN PATENT DOCUMENTS

| CN | 104238931 A | 12/2014 |
| CN | 105138222 A | 12/2015 |

(Continued)

OTHER PUBLICATIONS

International Search Report and Written Opinion dated Aug. 6, 2021 in International Application No. PCT/ CN2021/097290. English translation attached.

(Continued)

*Primary Examiner* — Yaron Cohen
(74) *Attorney, Agent, or Firm* — Sheppard, Mullin, Richter & Hampton LLP

(57) ABSTRACT

Provided are an information processing method and apparatus, a storage medium, and an electronic device. The information processing method includes: displaying a second control in response to a first operation on a first control; receiving a second operation on the second control, and determining, based on a position of the second control, target information corresponding to the second operation; and setting the target information as input information.

20 Claims, 8 Drawing Sheets

(58) Field of Classification Search
CPC .. G06F 3/0416; G06F 3/0482; G06F 3/04883; G06F 2203/04806; G06F 3/167
See application file for complete search history.

(56) References Cited

FOREIGN PATENT DOCUMENTS

| | | |
|---|---|---|
| CN | 105791946 A | 7/2016 |
| CN | 108536344 A | 9/2018 |
| CN | 109992187 A | 7/2019 |
| CN | 110704016 A | 1/2020 |
| CN | 110825303 A | 2/2020 |
| CN | 110866193 A | 3/2020 |
| CN | 111193599 A | 5/2020 |
| CN | 111831203 A | 10/2020 |
| JP | 2020009424 A | 1/2020 |
| WO | 2018148881 A1 | 8/2018 |

OTHER PUBLICATIONS

First Office Action from corresponding Chinese Application No. 202010635302.1, dated May 31, 2021. English translation attached.
The Second Office Action from corresponding Chinese Application No. 202010635302.1, dated Dec. 6, 2021. English translation attached.
The Grant Notice from corresponding Chinese Application No. 202010635302.1, dated Mar. 29, 2022. English translation attached.
Extended European Search Report dated Nov. 28, 2023 received in European Patent Application No. EP21833262.5.

\* cited by examiner

INFORMATION PROCESSING METHOD, STORAGE MEDIUM, AND ELECTRONIC DEVICE

CROSS-REFERENCE TO RELATED APPLICATIONS

This application is a continuation of International Application No. PCT/CN2021/097290, filed on May 31, 2021, which claims priority to Chinese Patent Application No. 202010635302.1 filed on Jul. 3, 2020 and entitled "INFORMATION PROCESSING METHOD AND APPARATUS, STORAGE MEDIUM, AND ELECTRONIC DEVICE", the entire disclosure of which is incorporated herein by reference.

FIELD

The present disclosure relates to the field of computer software technologies, and in particular, to an information processing method and apparatus, a storage medium, and an electronic device.

BACKGROUND

In current information age, information is becoming more and more indispensable to us as a necessary element for life and work, and the information may be transferred through a variety of software carrying the information. For example, when people express their opinions by "liking" contents such as music and videos, etc. in various software, which actually inputs and transmits the information to the software.

SUMMARY

Embodiments of the present disclosure provide an information processing method and apparatus, a storage medium, and an electronic device, which can flexibly process information.

In a first aspect, embodiments of the present disclosure provide an information processing method. The information processing method includes: displaying a second control in response to a first operation on a first control; receiving a second operation on the second control, and determining, based on a position of the second control, target information corresponding to the second operation; and setting the target information as input information.

In a second aspect, embodiments of the present disclosure provide an information processing apparatus. The information processing apparatus includes: a first receiving module configured to display a second control in response to a first operation on a first control; a second receiving module configured to receive a second operation on the second control, and determine, based on a position of the second control, target information corresponding to the second operation; and an input module configured to set the target information as input information.

In a third aspect, embodiments of the present disclosure provide a storage medium. The storage medium has a computer program stored thereon. The computer program, when executed on a computer, causes the computer to display a second control in response to a first operation on a first control; receive a second operation on the second control, and determine, based on a position of the second control, target information corresponding to the second operation; and set the target information as input information.

In a fourth aspect, embodiments of the present disclosure provide an electronic device. The electronic device includes a processor, and a memory having a computer program stored thereon. The processor is configured to invoke the computer program to: display a second control in response to a first operation on a first control; receive a second operation on the second control, and determine, based on a position of the second control, target information corresponding to the second operation; and set the target information as input information.

BRIEF DESCRIPTION OF THE DRAWINGS

In order to describe the technical solutions in embodiments of the present disclosure more clearly, the accompany drawings necessary for the description of the embodiments will be introduced briefly below. Obviously, the accompany drawings described below are only some embodiments of the present disclosure. For those skilled in the art, other drawings can be obtained based on these drawings without inventive efforts.

DETAILED DESCRIPTION

Figure 1:
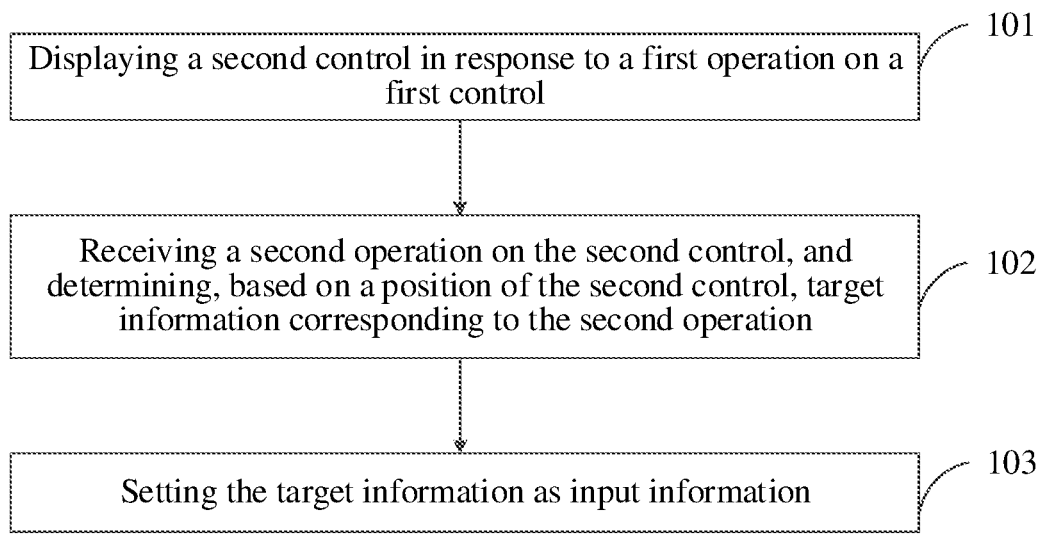
FIG. 1 is a schematic flowchart of an information processing method according to an embodiment of the present disclosure.

Referring to the drawings, same component symbols represent same components. The principle of the present disclosure is illustrated by performing in an appropriate computing environment. The following description is based on the illustrated specific embodiments of the present disclosure, which should not be regarded as limiting other specific embodiments of the present disclosure that are not described in detail herein.

Embodiments of the present disclosure provide an information processing method. An execution body of the information processing method may be an information processing apparatus according to the embodiments of the present disclosure, or an electronic device integrated with the information processing apparatus. The information processing apparatus may be implemented in a hardware or software manner. The electronic device may be a smart phone, a tablet computer, a Personal Digital Assistant (PDA), or the like. The mobile phone may be a full-screen mobile phone, a non-full-screen mobile phone, a foldable mobile phone, or the like. The specific detailed analysis and description will be set forth below.

For example, when an electronic device is used, the electronic device may display a first control. When a first operation is performed for the first control by a user, the electronic device may display a second control. A plurality of candidate information is obtained by a second operation on the second control by the user and based on a position movement of the second control. When the second control stops moving, target information corresponding to the second operation can be determined based on an end position of the second control. Then, the target information is set as input information.

According to embodiments of the present disclosure, there is provided an information processing method. The information processing method includes: displaying a second control in response to a first operation on a first control; receiving a second operation on the second control, and determining, based on a position of the second control, target information corresponding to the second operation; and setting the target information as input information.

In one embodiment, the determining, based on the position of the second control, the target information corresponding to the second operation includes: in response to the second operation on the second control, moving the second control, and obtaining an end position of the second control; and determining, based on the end position of the second control, the target information corresponding to the second operation.

In one embodiment, the determining, based on the end position of the second control, the target information corresponding to the second operation includes: determining a target dwell region of the second control based on the end position; and selecting, based on a mapping relationship between a predetermined dwell region and predetermined information, information corresponding to the target dwell region as the target information.

In one embodiment, the information processing method further includes, subsequent to the selecting the information corresponding to the target dwell region as the target information: determining, based on a mapping relationship between the predetermined information and an information display form, an information display form corresponding to the target information as a target information display form; and displaying the target information based on the target information display form.

In one embodiment, the information display form includes an image form. The information processing method further includes, prior to the determining, based on the end position of the second control, the target information corresponding to the second operation: obtaining a candidate position of the second control in response to a movement of the second control being detected; obtaining, based on the candidate position, candidate information and a candidate image corresponding to the candidate information; displaying the candidate information in real time based on the candidate image; and obtaining the end position of the second control in response to detecting that the movement of the second control is stopped.

In one embodiment, the displaying the candidate information in real time based on the candidate image includes: obtaining a start position of the second control; adjusting a size of the candidate image based on the start position and the candidate position; and displaying the candidate information in real time based on the adjusted candidate image.

In one embodiment, the information processing method further includes: obtaining a target movement direction of the second control; and selecting, based on a mapping relationship between a predetermined movement direction and a dwell region set, a dwell region set corresponding to the target movement direction as a target dwell region set.

In one embodiment, the determining the target dwell region of the second control based on the end position includes: determining the target dwell region of the second control from the target dwell region set based on the end position.

In one embodiment, the first operation includes a touch operation. The displaying the second control in response to the first operation on the first control includes: obtaining a touch position of the touch operation; and displaying the second control based on the touch position.

As illustrated in FIG. 1 showing a schematic flowchart of an information processing method according to an embodiment of the present disclosure, the information processing method may include the following steps.

At step 101, a second control is displayed in response to a first operation on a first control.

Here, the first control may be a control for a user to perform the first operation to trigger the display. In some embodiments, the control may be in several forms such as a button, an icon, a hyperlink, or the like. For example, the first control may be in an icon form. For example, the first control may be in an icon "Like" form, which may be set as desired.

Here, the first control may be displayed in several manners. In some embodiments, the first control may be displayed on an interaction page. In a further embodiment, the first control may be displayed at any position on the interaction page. For example, the first control may be displayed at any position of an upper part, a middle part, and a lower part of the interaction page. For example, the first control may also be displayed on a side display screen of the electronic device. For yet another example, the first control may be displayed based on a position at which the first operation is performed by the user. For example, when the user clicks at a certain position of the screen, the first control may be displayed at this position.

Here, in some embodiments, before in response to the first operation on the first control, the first control may be displayed through triggering by an operation. The first control may have a plurality of triggering positions. For example, the first control may be arranged on the interaction page. For example, the first control may be arranged on a display screen of the electronic device. In this case, when the user performs the first operation on the display screen, the first control may be triggered to display. For another example, the first control may be arranged on a side edge frame of the electronic device. In this case, when the user performs the first operation on the side edge, the first control may be triggered to display.

Here, the first operation may include a plurality of forms. For example, the first operation may be the touch operation. For another example, the first operation may also be a clicking, sliding, continuous clicking operation, or the like.

For another example, the first operation may be a voice input operation. In some embodiments, the electronic device operates the first control by obtaining voice input of the user. For example, when the user says to the electronic device: "clicking the first control", the electronic device receives this voice information and performs a first touch operation on the first control.

For another example, the first operation may be an air operation. In some embodiments, the electronic device may operate the first control by capturing an action of the user without touching the display screen by the user. For example, when a leftward sliding action is made to the electronic device without touching the screen by the user, the electronic device performs a leftward sliding operation on the first control by capturing the action of the user.

Here, the second control may be a control for the user to operate to input information. In some embodiments, the second control may be in several forms such as a slider on a sliding bar. The information may be input through operating the slider by the user. For another example, the second control may be an input box. The information such as numbers and texts may be input through the input box.

Figure 2:
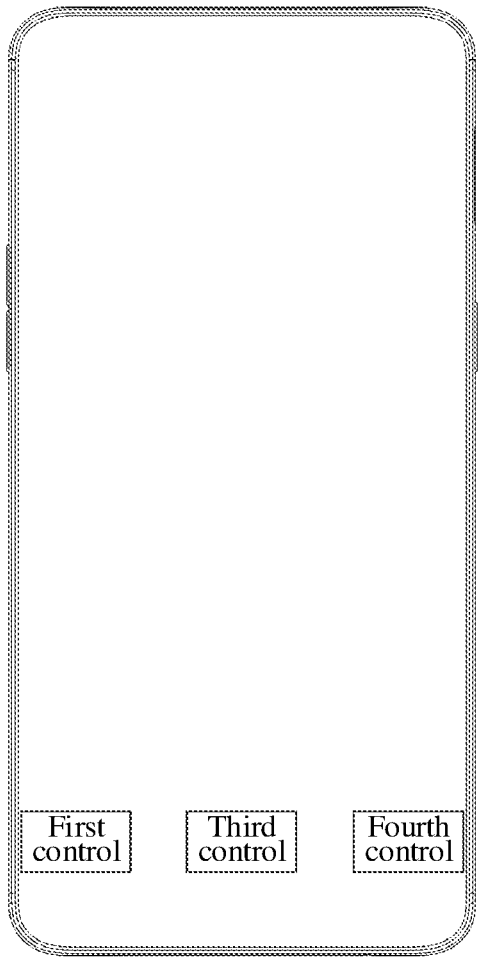
FIG. 2 is a schematic diagram of a control display of an information processing method according to an embodiment of the present disclosure.

For example, as illustrated in FIG. 2, the electronic device may display the interaction page. The interaction page includes a plurality of controls, such as the first control, a third control, and a fourth control. In response to the electronic device receiving a clicking and touching operation on the first control performed by the user, the second control may be displayed on the interaction page. The first control may be an icon of "Like", and the second control may be the slider on the sliding bar. When the second control is displayed, predetermined default information or no information may be input through the second control, which may be set as desired.

Here, in some embodiments, the first operation may be the touch operation. In this case, the touch position of the touch operation is determined by obtaining the touch operation on the display screen performed by the user, and then the second control is displayed based on the touch position. Thus, the displaying the second control in response to the first operation on the first control may include: obtaining the touch position of the touch operation; and displaying the second control based on the touch position.

For example, when the first operation is a long-press touch operation, a touch position of the touch operation performed on the display screen of the electronic device by the user may be obtained, and the second control is displayed based on the touch position. For example, when the first control is displayed at a lower left corner of the interaction page, and when the user presses for a predetermined period of time at any position on the display screen, a press position of the press operation performed on the display screen by the user is obtained, and then the second control is displayed at this position.

For another example, when the first operation is the click and touch operation, a click position of the click and touch operation performed on the display screen by the user is obtained, and the second control is displayed at the click position.

For another example, when the first operation is a sliding operation, an end position of the sliding operation performed by the user may be obtained, and the second control is displayed at the end position.

By displaying the second control based on the touch position of the touch operation, the second control may be flexibly displayed. In this way, it is possible for the second control to be triggered to display when the operation is performed in different situations (such as a one-handed operation), which effectively improves operation efficiency and facilitates use experience.

At step 102, a second operation on the second control is received, and a target information corresponding to the second operation is determined based on a position of the second control.

Here, the second operation may be in several forms such as sliding, continuous clicking, or the like. For example, the second operation may also be an operation such as clicking. The second operation may also be in a form such as an air operation, a voice operation, or the like, which may be set as desired.

Here, in some embodiments, the determining, based on the position of the second control, the target information corresponding to the second operation may include: in response to the second operation on the second control, moving the second control, and obtaining an end position of the second control; and determining, based on the end position of the second control, the target information corresponding to the second operation.

For example, when the second operation of the second control is received by the electronic device, the second control may be moved in response to the second operation. For example, when the second operation is the sliding operation, the second control may be moved, and the end position of the second control may be obtained. Then, the target information corresponding to the second operation is determined based on the end position.

Here, in some embodiments, the determining, based on the end position of the second control, the target information corresponding to the second operation may include: determining a target dwell region of the second control based on the end position; and selecting, based on a mapping relationship between a predetermined dwell region and predetermined information, information corresponding to the target dwell region as the target information.

Here, the end position of the second control may be a dwell position of the second control when it is detected that the movement of the second operation is stopped. For example, when the sliding operation is performed on the second control by the user, the position of the second control is changed. When it is detected that the sliding operation is stopped, the dwell position of the second control is the end position of the second control.

Figure 3:
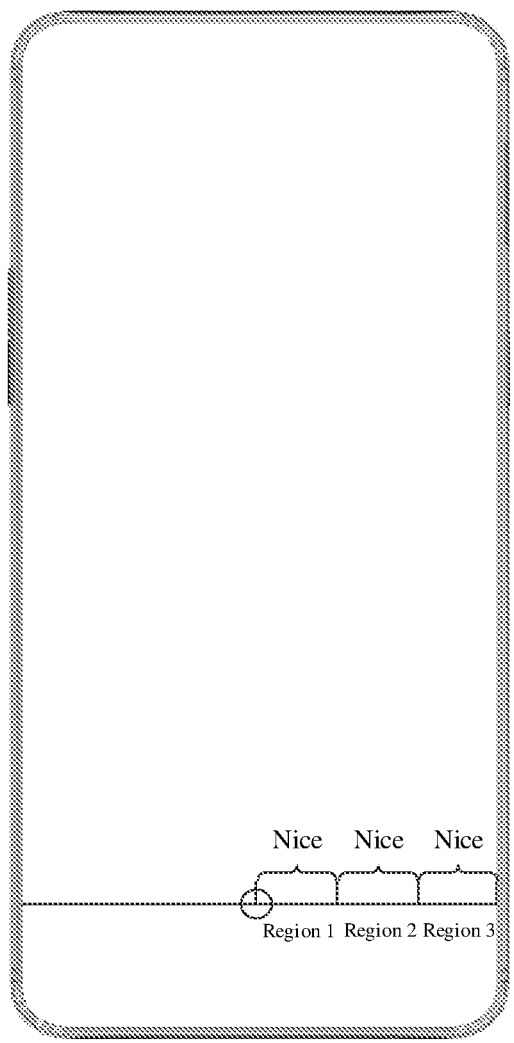
FIG. 3 is a schematic diagram of a mapping relationship between a dwell region and information according to an embodiment of the present disclosure.

Here, in some embodiments, a mapping relationship between the dwell region and the information may be pre-established. For example, "Region 1" corresponds to "Nice". "Region 2" corresponds to "Great". "Region 3" corresponds to "wow". When a predetermined relationship is pre-established, it may be based on:

For example, as illustrated in FIG. 3, "Region 1" corresponds to "Nice". "Region 2" corresponds to "Great". "Region 3" corresponds to "wow". When the second control is the slider on the sliding bar, the sliding bar may be divided into a plurality of segments. Different segments correspond to different dwell regions corresponding to different information. When an end position of the slider is "Region 3", information corresponding to "Region 3" is "wow". Therefore, "wow" is selected as the target information.

Here, the information processing method may further include, subsequent to the selecting information corresponding to the target dwell region as the target information: determining, based on a mapping relationship between the predetermined information and an information display form, an information display form corresponding to the target information as a target information display form; and displaying the target information based on the target information display form.

After the target information is determined, since the information is actually invisible, the target information may be displayed based on different display forms, to realize visualization of the information.

Here, a plurality of information display forms is provided. For example, the information display form may be a multimedia form. The multimedia form may include forms such as an image, a video, or a music. An image form may be a JPEG format (Joint Photographic Expert Group), or may also be a GIF format (Graphics Interchange Format). For another example, the information display form may be an expression form, such as an emoji expression. For another example, the information display form may also be a form such as texts, a video, or an audio. The information display form may be one form or a combination of a plurality of forms, which may be set as desired.

Here, the target information may be displayed based on the target information display form in several manners. For example, when the second control is displayed on the interactive page, the target information may be displayed at any position on the interactive page based on the target information display form. For another example, when the information display form is the audio, the audio may be played by the electronic device.

For example, when the target information is "Angry", a corresponding information display form is an "Angry" emoji expression, which may be displayed on the second control.

For another example, when the target information is "Happy", the corresponding information display form is a cheerful audio, and the audio may be played by the electronic device.

Here, in the case where the target information is displayed based on the target information display form, in response to the movement of the second control being stopped, a third operation on the second control may be further received, and the target information is displayed based on an operation time of the third operation and the target information display form. For example, when the user stops sliding, the "Angry" emoji expression is displayed on the second control. When the user then performs the pressing operation, a pressing duration of the pressing operation performed by the user is obtained, and the corresponding pressing duration is displayed on the interaction interface by the expression in a full-screen, scrolling, or sliding manner. With this display manner, an expression mode of user's viewpoint is richer and more diversified, to further improve user experience.

Here, in some embodiments, when the target information is displayed based on the target information display form, the target information display form may also be adjusted. For example, when the information display form is the image, a movement distance may be obtained based on the start position and the end position, and a size of the image may be adjusted based on the movement distance. For another example, when the information display form is the audio, a volume of the audio may be adjusted based on the movement distance. Attributes (such as an area and a volume) of the information display form may be adjusted based on the actual requirements.

Since the movement of the second control may be based on the second operation, when the movement of the second control is detected, i.e., the second control actually moves between several dwell regions, information corresponding to each dwell region may be obtained based on a temporary dwell position of the second control (i.e., the candidate position), and the candidate information is displayed based on information display form corresponding to the candidate information. Therefore, the candidate information and a candidate information display form can be previewed in real time, to provide a plurality of information choices for the user. Thus, the user may select desired information from the plurality of pieces of candidate information to express his/her viewpoint.

Here, in some embodiments, the information display form includes an image form. In this case, the determining, based on the end position of the second control, the target information corresponding to the second operation further includes: in response to detecting the movement of the second control, obtaining a candidate position of the second control; obtaining, based on the candidate position, candidate information and a candidate image corresponding to the candidate information; displaying the candidate information in real time based on the candidate image; and in response to detecting that the movement of the second control is stopped, obtaining the end position of the second control.

Here, in some embodiments, subsequent to determining the candidate image and the candidate information, the start position and the candidate position of the second control may also be obtained, to adjust the size of the image based on the start position and the candidate position. Thus, the displaying the candidate information in real time based on the candidate image may include: obtaining the start position of the second control; adjusting the size of the candidate image based on the start position and the candidate position; and displaying the candidate information in real time based on the adjusted candidate image.

Here, the size of the candidate image may be adjusted in several ways based on the start position and the candidate position. For example, a movement distance of the second control may be determined based on the start position and the candidate position, and the size of the candidate image may be adjusted based on the movement distance. For example, when the movement distance is larger, an area of the candidate image is correspondingly increased, which may be set as desired.

For example, when the second control is the slider on the sliding bar, the user may slide the slider. In response to the movement of the second control being detected, a current coordinate position of the slider is obtained in real time, and is set as the candidate position. A movement distance of the second control relative to the start position is determined based on the candidate position of the slider. When a sliding distance is obtained, the dwell region where the second control is currently located may be determined based on the sliding distance. After information corresponding to the dwell region and an image corresponding to the information are obtained, the size of the image is adjusted based on the sliding distance, and is displayed on the second control.

Figure 4:
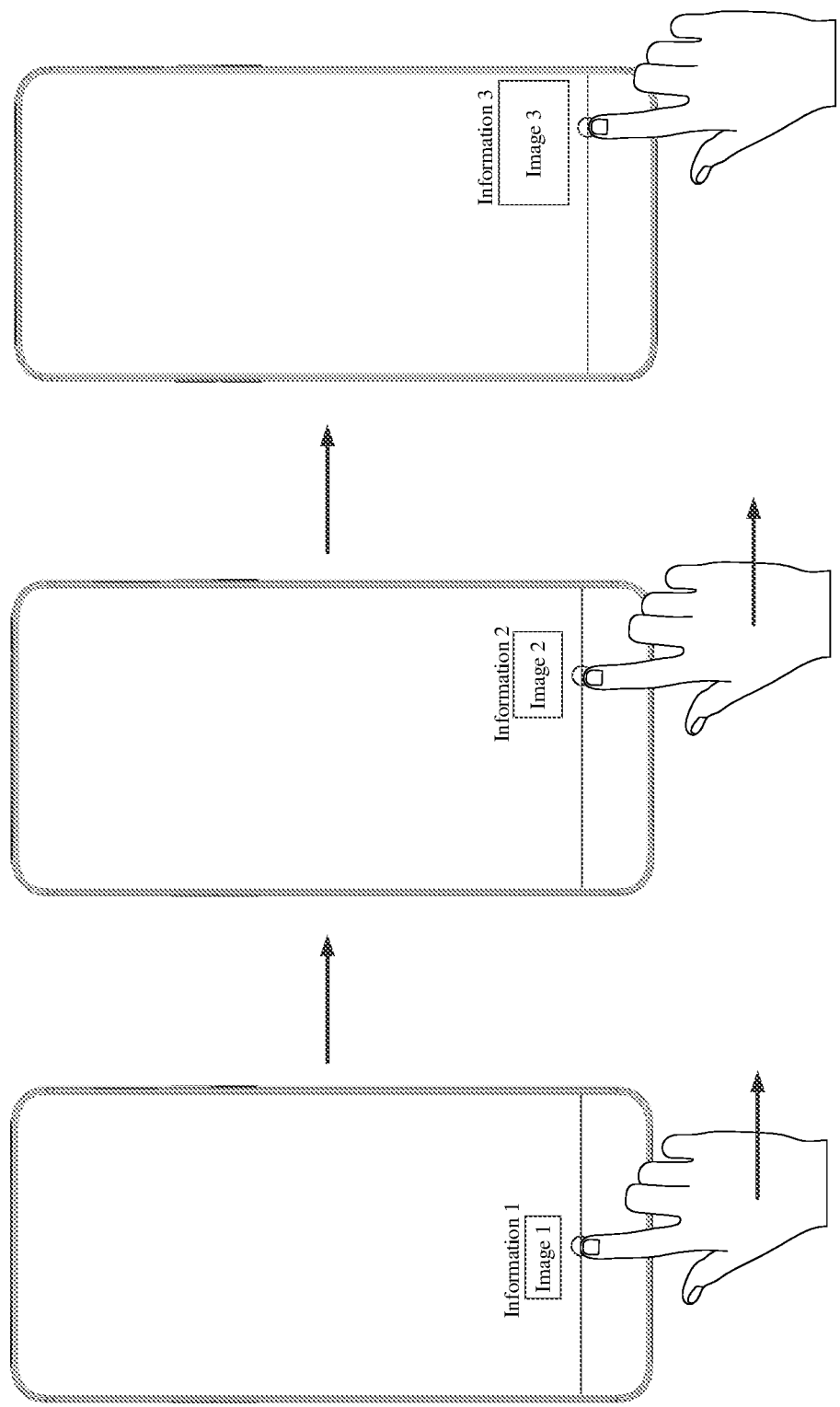
FIG. 4 is a schematic diagram of a first interaction of an information processing method according to an embodiment of the present disclosure.
Figure 5:
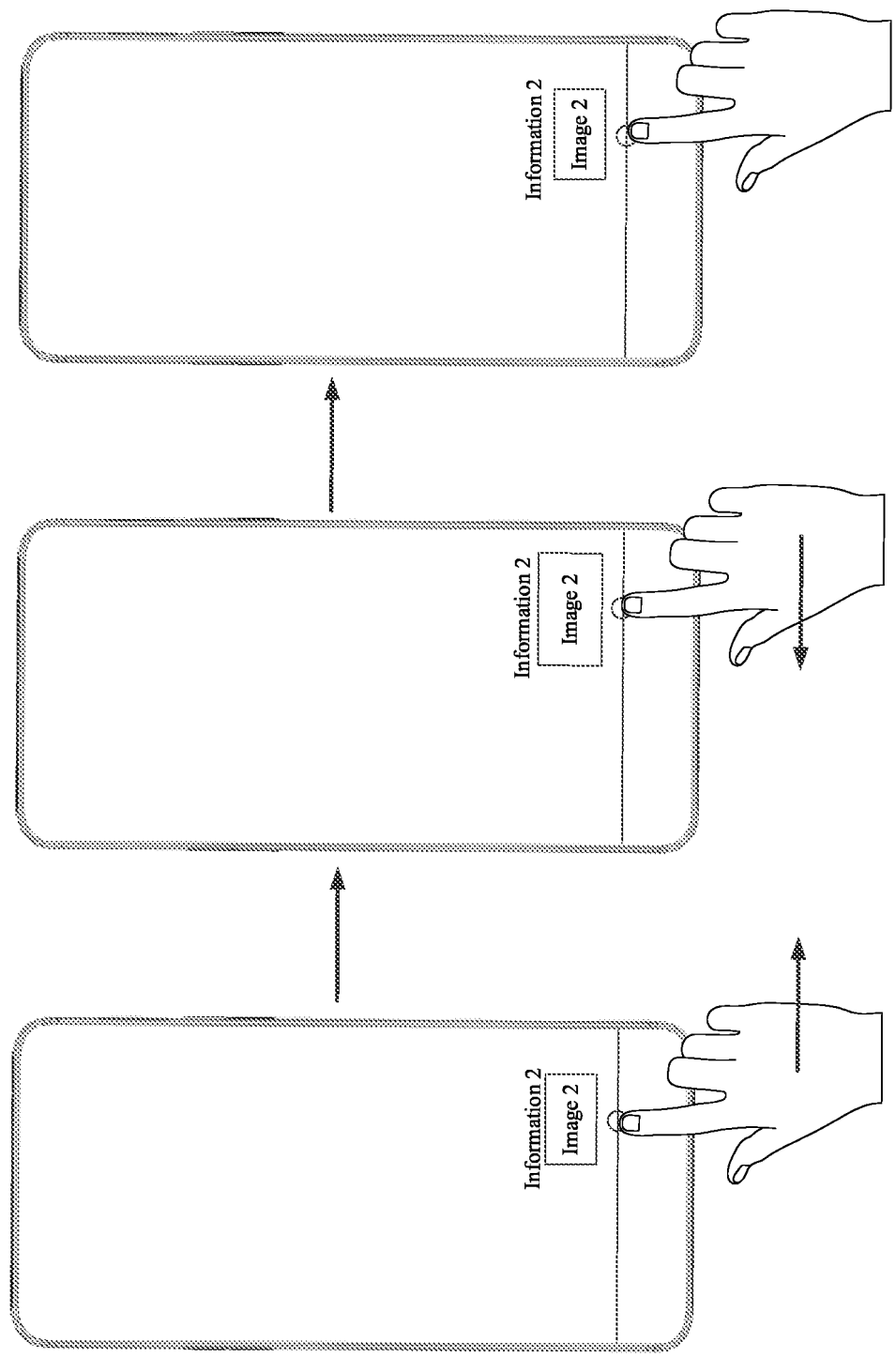
FIG. 5 is a schematic diagram of a second interaction of an information processing method according to an embodiment of the present disclosure.

For example, as illustrated in FIG. 4, when the user slides the slider on the interaction page, as the user slides, the information corresponding to each dwell region through which the sliding operation passes and the image corresponding to the information may be displayed on the interaction page in real time. During the movement, a distance of a current position of the slider relative to the start position may be obtained, and the size of the image is adjusted based on the distance. As illustrated in FIG. 5, when the slider is slid back and forth in a same dwell region, a same image of different sizes may be previewed based on the movement distance. At this time, the user may select the required information from the plurality of pieces of information by sliding. In response to detecting that the sliding operation performed by the user is stopped, a current position where the slider is located is selected as the end position.

As can be seen from the above, the user may preview the plurality of pieces of candidate information and the candidate information display form corresponding to the candidate information in real time through the second operation performed on the second control by the user. Further, the attributes of the information display form may also be adjusted in the real-time previewing process. Thus, not only more information choices are provided to the user, but also efficiency of inputting the information by the user is also effectively improved, which can provide better user experience.

In some embodiments, since the information may include different types, when the second control is moved, information types corresponding to different directions may be determined based on a movement direction of the second control firstly. In some embodiments, since different dwell regions correspond to different information, actually, dwell region sets corresponding to different directions are determined. Then, the target dwell region of the second control is determined from the target dwell region set based on the end position. Then, corresponding information is determined based on the target dwell region.

Here, in some embodiments, the information processing method may include: obtaining a target movement direction of the second control; and selecting, based on a mapping relationship between a predetermined movement direction and a dwell region set, a dwell region set corresponding to the target movement direction as a target dwell region set.

The determining the target dwell region of the second control based on the end position includes: determining the target dwell region of the second control from the target dwell region set based on the end position.

Here, when obtaining the target movement direction of the second control, by obtaining the start position and the end position of the second control, the movement direction of the second control may be determined based on the start position and the end position of the second control. The start position of the second control may be a display position of the second control. For example, when the second control is displayed at a certain position on the interaction interface based on the second operation, the display position is the start position of the second control.

Figure 6:
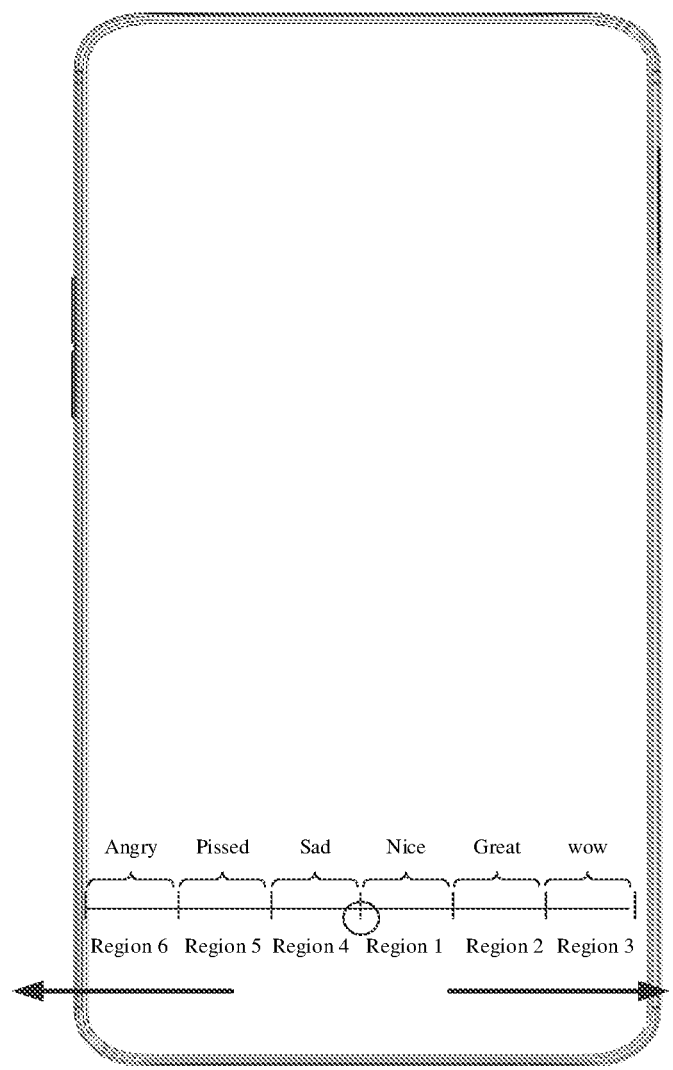
FIG. 6 is a schematic diagram of a third interaction of an information processing method according to an embodiment of the present disclosure.

Here, a mapping relationship between the movement direction and the dwell region set may be pre-established. For example, the second control may be triggered to display through the first operation on the first control. When the second control is the slider on the sliding bar, a start position of the slider may be located at a center of the sliding bar. As illustrated in FIG. 6, when the slider slides leftwards, an information type corresponding to a left dwell region may be "negative emotion information", which includes "Sad", "Pissed", and "Angry". With a change of the movement distance, emotion communicated by the information corresponding to each dwell region is constantly variable. For example, when the slider is moved leftwards, the information corresponding to each dwell region may be "Sad", "Pissed", and "Angry" in sequence. When the slider is slid rightwards, an information type corresponding to a right dwell region may be "positive emotion information", which includes "Nice", "Great" and "wow". Similar to the change of the slider when moved leftwards, when the slider is moved rightwards, the information corresponding to each dwell region may be "Nice", "Great" and "wow" in sequence. It can be seen that as the movement distance changes, the emotion communicated by the information changes from weak to strong.

As can be seen from the above, the user may preview the plurality of pieces of candidate information and the candidate information display form corresponding to the candidate information in real time through the second operation performed on the second control by the user. In the real-time previewing process, the emotion communicated by the information changes as the movement distance changes. The attributes of the information display form (for example, the size of the image and the volume of the audio) may be adjusted based on the movement distance.

With the method according to the embodiments of the present disclosure, when inputting the information by the user, more diversified information may be input. Further, more information may be further input through the change of the attribute. For example, the user may select expressions of different strong degrees and change sizes of the expressions to express his/her viewpoints. For example, when the user wants to express the anger feeling, a maximum "Angry" expression may be selected through the operation by the user to express strong anger feeling. Thus, according to the embodiments of the present disclosure, not only more information choices can be provided to the user, but also the efficiency of inputting the information by the user can be effectively improved, which can provide better user experience.

At step 103, the target information is set as input information.

In some embodiments, the information processing method further includes, subsequent to the target information being set as the input information: displaying the input information on the first control based on the target information display form.

Figure 7:
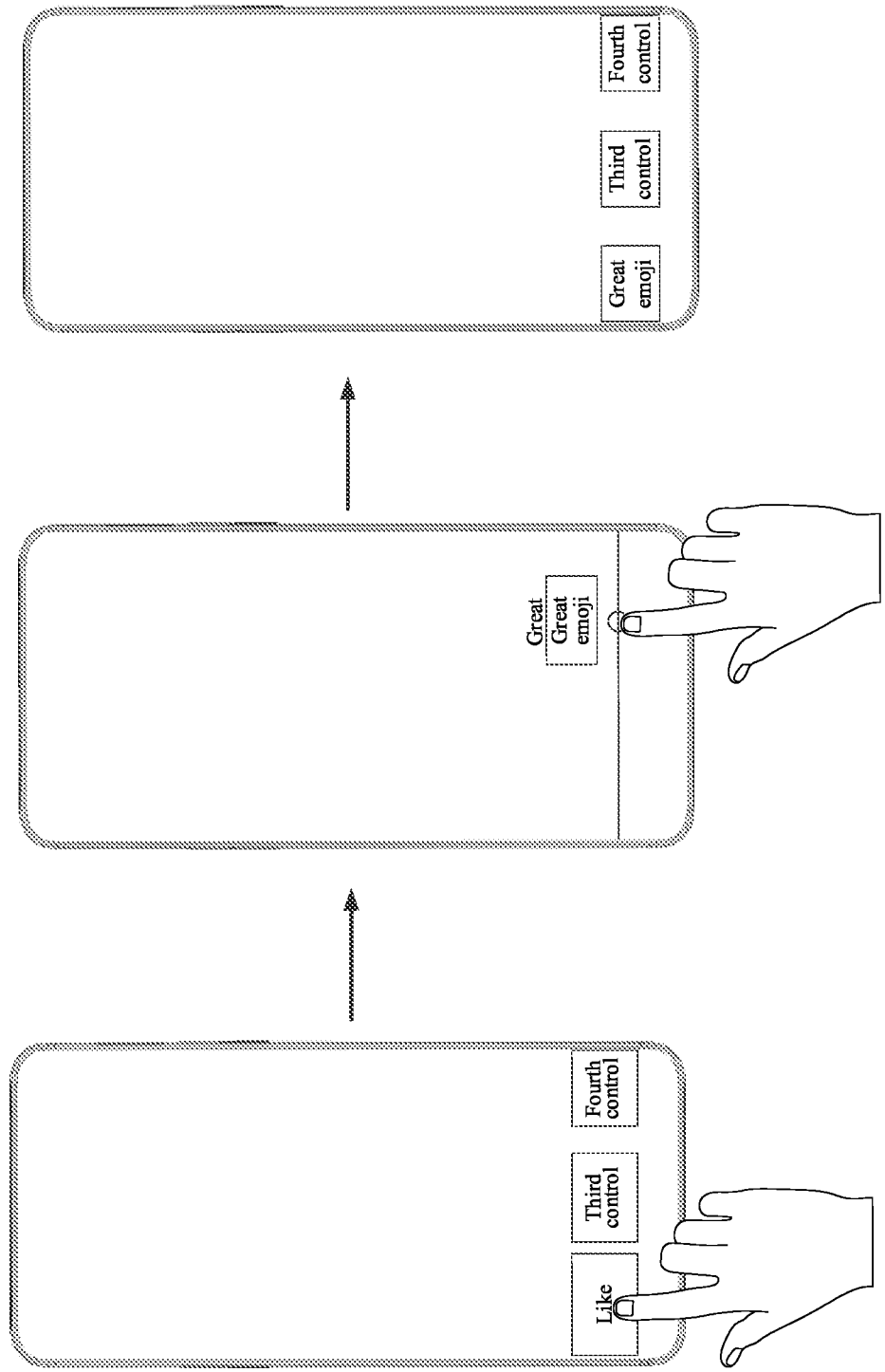
FIG. 7 is a schematic diagram of a fourth interaction of an information processing method according to an embodiment of the present disclosure.

Here, the input information may be displayed on the first control based on the target information display form in several manners. For example, a display form of the first control may be changed based on the target information display form. For example, as illustrated in FIG. 7, when it is determined by the user that the target information is "Great" through the second control, the corresponding target information display form is the "Great" emoji expression. When it is detected that the second operation performed by the user has stopped for a period of time, the first control may be displayed again. When a form of the first control is the icon of "Like", the icon of "Like" is replaced with an emoji expression selected by the user and is displayed on the interaction interface. At this time, the "Great" emoji expression can be displayed on the interaction interface of the user.

In some embodiments, the user may change the information that has been inputted. For example, after the user send a "Great" opinion on a certain article on a social software, the user changes the opinion on the article after a period of time, e.g., the user wants to change the "Great" opinion into "Angry" opinion. In this case, the second control may be displayed by operating the first control again. When the second control is displayed, a maximum expression of "Great" is displayed on the second control. By operating the second control again, the input information may be changed to "Angry", and the corresponding information display form is an "Angry" emoji expression, which in turn changes information displayed on the first control and the information display form.

In some embodiments, the information processing method may include, subsequent to the target information being set as the input information: in response to the first operation on the first control, displaying the second control; and displaying the target information on the second control based on the target information display form.

In the method according to the embodiments of the present disclosure, the second control is displayed in response to the first operation on the first control, the second operation on the second control is received, and the target information corresponding to the second operation is determined based on the position of the second control, and the target information is set as the input information. In addition, in the embodiments of the present disclosure, different information can be obtained based on a position change of the second control. Then, the target information is determined based on the end position of the second control, and is set as the input information. Therefore, the information can be flexibly processed.

The method as described in the above embodiments will be described in detail below by way of example.

Figure 8:
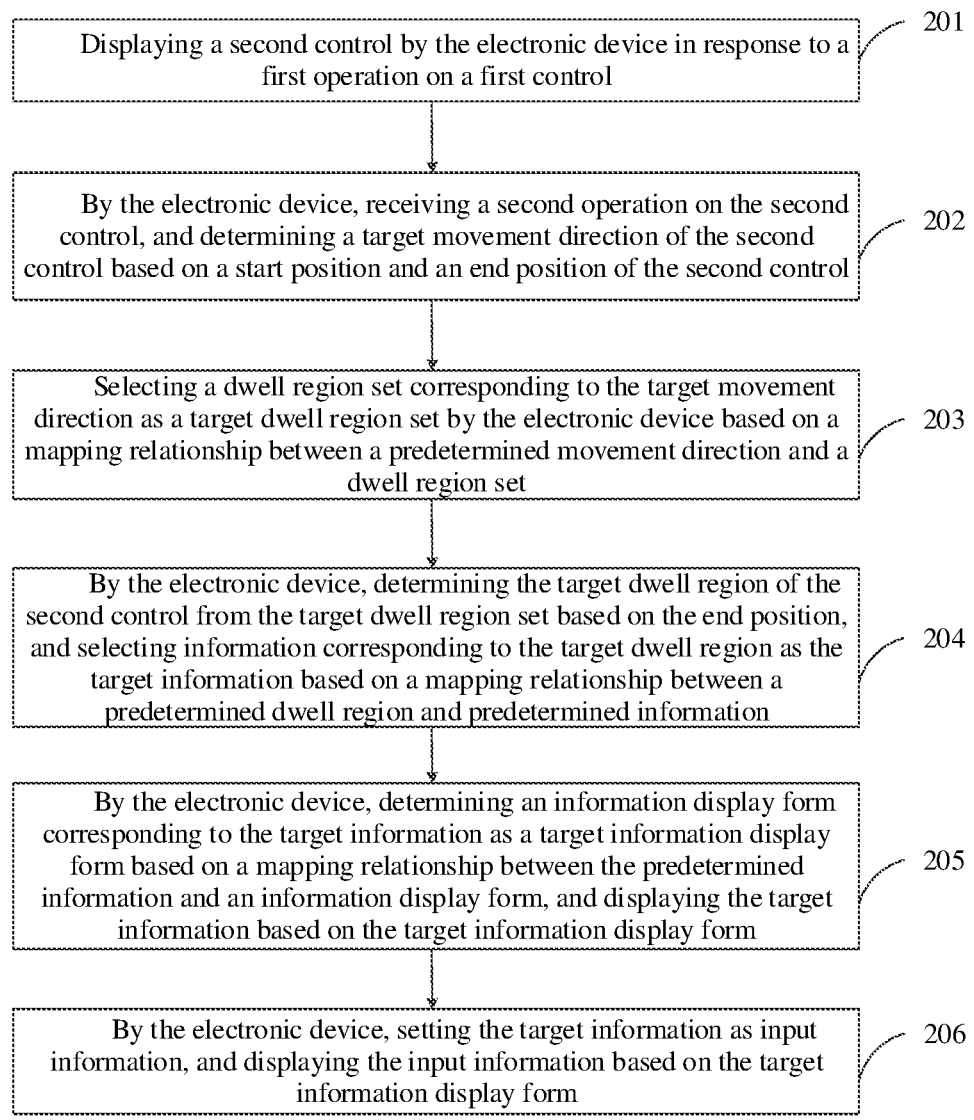
FIG. 8 is another schematic flowchart of an information processing method according to an embodiment of the present disclosure.

Referring to FIG. 8, another schematic flowchart of the information processing method according to the embodiments of the present disclosure is shown. The information processing method may be executed by an electronic device. The electronic device may be a smart phone, a tablet computer, a Personal Digital Assistant (PDA), or the like. The information processing method will be described and analyzed below by the electronic device for executing the information processing method. The information processing method may include actions at blocks 201 to 206.

At block 201, a second control is displayed by the electronic device in response to a first operation on a first control.

For example, the electronic device may display an interaction page including a plurality of controls such as the first control, a third control, and a fourth control. When a click and touch operation performed for the first control by a user is received by the electronic device, the second control may be displayed on the interaction page based on a position of the click and touch operation. The first control may be an icon of "Like". The second control may be a slider on a sliding bar. When the slider and the sliding bar are displayed, the information may be input by moving the slider on the sliding bar.

At block 202, a second operation on the second control is received by the electronic device, and a target movement direction of the second control is determined by the electronic device based on a start position and an end position of the second control.

For example, when the user performs a sliding operation on the slider on the interaction page, a start position of the slider may be located in a center of the sliding bar. Correspondingly, an information type corresponding to a dwell region at a left side of the sliding bar may be "negative emotion information" including "Sad", "Pissed", and "Angry". An information type corresponding to a right dwell region may be "positive emotion information" including "Nice", "Great", and "wow". As the sliding operation is performed by the user, the movement direction will be changed. The corresponding information type may also be changed. When the sliding operation performed by the user is received, the electronic device may allow the slider to move in response to the sliding operation. When the sliding operation performed by the user is stopped, an end position of the slider may be obtained, and then different dwell region sets are selected based on the start position and the end position of the slider.

At block 203, a dwell region set corresponding to the target movement direction is selected as a target dwell region set by the electronic device based on a mapping relationship between a predetermined movement direction and the dwell region set.

For example, when the second control is slid rightwards, the movement direction of the second control is a rightward direction. Therefore, a "positive emotion information" set corresponding to the right dwell region is selected as the target dwell region set.

At block 204, the target dwell region of the second control is determined by the electronic device from the target dwell region set based on the end position, and information corresponding to the target dwell region is selected as the target information based on a mapping relationship between a predetermined dwell region and predetermined information.

For example, when the information display form is an image, the user may move the slider on the sliding bar displayed on the interaction page. As the sliding operation is performed by user, information corresponding to each dwell region through which the sliding operation passes and the image corresponding to the information may be displayed on the interaction page in real time. During the movement, a distance of a current position from the start position of the slider may be obtained. A size of the image is adjusted based on the distance. For example, when the slider is slid back and forth in the same dwell region, the different sizes of the same image may be previewed based on the movement distance. The user may select desired information from the plurality of information through the sliding. When it is detected that the sliding operation performed by the user is stopped, the current position where the slider is located is selected as the end position.

After the end position is determined, since the movement direction is the rightward direction, the target dwell region is selected from the "positive emotion information" set based on the end position. In some embodiments, the movement distance is obtained based on the start position and the end position, and the target dwell region is determined as "Region 3" based on the movement distance. As illustrated, when it is determined that the target dwell region is the "Region 3", information corresponding to the "Region 3" is "wow", and "wow" is selected as the target information.

At block 205, an information display form corresponding to the target information is determined as a target information display form by the electronic device based on a mapping relationship between the predetermined information and an information display form, and the target information is displayed by the electronic device based on the target information display form.

For example, since the target information "wow" corresponds to an emoji expression of "wow", the electronic device may display the emoji expression of "wow" at the end position of the second control.

At block 206, the target information is set as input information by the electronic device, and the input information is displayed by the electronic device based on the target information display form.

For example, the user may determine that the target information is "wow" by moving the slider, and the corresponding target information display form is the emoji expression of "wow". When it is detected that the operation performed by the user is stopped for a period of time, the first control may be displayed again. When the form of the first control is an icon of "Like", the icon of "Like" is replaced with the emoji expression selected by the user, and this the emoji expression selected by the user is displayed on the interaction interface. At this time, the emoji expression of "wow" is displayed on the interaction interface of the user.

In some embodiments, the user may change the information that has been inputted. For example, after the user publishes a "wow" opinion on a certain article on a social software, the user changes his/her attitude to the article after a period of time. For example, the user wants to change his/her opinion to "Angry". Then, the second control may be displayed by operating the first control again. When the second control is displayed, a maximum expression of "wow" is displayed on the second control. By operating the second control again, the input information may be changed to "Angry", and the corresponding information display form is the "Angry" emoji expression. Further, the information and the information display form displayed on the first control are changed.

Therefore, in the embodiments of the present disclosure, in response to the first operation on the first control, the electronic device can display the second control. Then, the electronic device can receive the second operation on the second control and determine the target movement direction of the second control based on the start position and the end position of the second control. Thereafter, the electronic device can select the dwell region set corresponding to the target movement direction as the target dwell region set based on the mapping relationship between the predetermined movement direction and the dwell region set. Then, the electronic device can determine the target dwell region of the second control from the target dwell region set based on the end position, and select the information corresponding to the target dwell region as the target information based on the mapping relationship between the predetermined dwell region and the information. The electronic device can further determine the information display form corresponding to the target information as the target information display form based on the mapping relationship between the predetermined information and the information display form, and display the target information based on the target information display form. The electronic device can further set the target information as the input information, and display the input information based on the target information display form. In the present disclosure, different information can be obtained based on the position change of the second control. Then, the target information is determined based on the end position of the second control, and is set as the input information. Therefore, the information can be flexibly processed.

In order to facilitate better implementation of the information processing method according to the embodiments of the present disclosure, the embodiments of the present disclosure further provide an apparatus based on the above information processing method. The meaning of the term is the same as that in the information processing method. Specific implementation details may refer to the description of the method embodiments.

Figure 9:
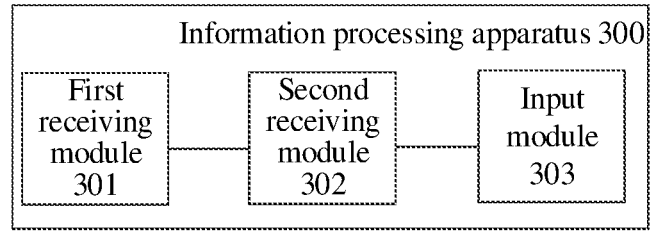
FIG. 9 is a schematic module diagram of an information processing apparatus according to an embodiment of the present disclosure.

Referring to FIG. 9, a schematic module diagram of an information processing apparatus 300 according to an embodiment of the present disclosure is illustrated. In some embodiments, the information processing apparatus 300 includes a first receiving module 301, a second receiving module 302, and an input module 303.

The first receiving module 301 is configured to display a second control in response to a first operation on a first control.

The second receiving module 302 is configured to receive a second operation on the second control, and determine, based on a position of the second control, target information corresponding to the second operation.

The input module 303 is configured to set the target information as input information.

In some embodiments, the first receiving module 301 is configured to obtain a touch position of a touch operation, and display the second control based on the touch position.

In some embodiments, the second receiving module 302 is configured to: move the second control and obtain an end position of the second control in response to the second operation on the second control; and determine, based on the end position of the second control, the target information corresponding to the second operation.

In some embodiments, the second receiving module 302 is configured to: determine a target dwell region of the second control based on the end position; and select, based on a mapping relationship between a predetermined dwell region and predetermined information, information corresponding to the target dwell region as the target information.

In some embodiments, the second receiving module 302 is configured to: determine, based on a mapping relationship between the predetermined information and an information display form, an information display form corresponding to the target information as a target information display form; and display the target information based on the target information display form.

In some embodiments, the information display form includes an image form. The second receiving module 302 may be further configured to: obtain a candidate position of the second control in response to detecting a movement of the second control; obtain, based on the candidate position, candidate information and a candidate image corresponding to the candidate information; display the candidate information in real time based on the candidate image; and obtain the end position of the second control in response to the movement of the second control is stopped.

In some embodiments, the second receiving module 302 may be further configured to: obtain a start position of the second control; adjust a size of the candidate image based on the start position and the candidate position; and display the candidate information in real time based on the adjusted candidate image.

In some embodiments, the second receiving module 302 may be further configured to: obtain a target movement direction of the second control; and select, based on a mapping relationship between a predetermined movement direction and a dwell region set, a dwell region set corresponding to the target movement direction as a target dwell region set. The determining the target dwell region of the second control based on the end position includes determining the target dwell region of the second control from the target dwell region set based on the end position.

In some embodiments, the input module 303 may be configured to display the input information on the first control based on the target information display form.

Therefore, in the information processing apparatus according to the embodiments of the present disclosure, the first receiving module 301 is configured to display the second control in response to the first operation on the first control. The second receiving module 302 is configured to receive the second operation on the second control, and determine, based on the position of the second control, the target information corresponding to the second operation. The input module 303 is configured to set the target information as the input information. In the embodiments of the present disclosure, different information can be obtained based on the position change of the second control. Then, the target information is determined based on the end position of the second control, and is set as the input information. Therefore, the information can be flexibly processed.

Figure 10:
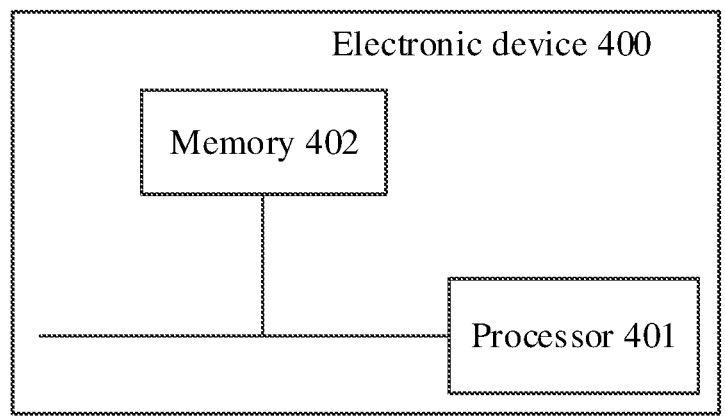
FIG. 10 is a schematic structural diagram of an electronic device according to an embodiment of the present disclosure.

The embodiments of the present disclosure further provide an electronic device 400. Referring to FIG. 10, the electronic device 400 includes a processor 401 and a memory. The processor 401 is electrically connected to the memory.

The processor 400 is a control center of the electronic device 400, and is configured to connect each part of the electronic device by various interfaces and circuits, and perform various functions of the electronic device 400 and process data by executing or loading computer programs stored in the memory 402 and invoking data stored in the memory 402, to monitor the electronic device 400.

The memory 402 may be configured to store software programs and modules. The processor 401 is configured to perform various functional applications and data processes by executing the computer programs and modules stored in the memory 402. The memory 402 may mainly include a program storage region and a data storage region. The program storage region may store an operation system, computer programs required for at least one function (such as a program having a sound playing function, a program having an image playing function), and the like. The data storage region may store data established based on the use of the electronic device. In addition, the memory 402 may include a high-speed random-access memory, and may also include a non-volatility memory such as at least one disk memory, a flash memory, or other volatility solid state memory. Accordingly, the memory 402 may further include a memory controller to provide access to the memory 402 by the processor 401.

In the embodiments of the present disclosure, the processor 401 of the electronic device 400 is capable of loading instructions corresponding to processes of one or more computer programs into the memory 402, and implementing the computer program stored in the memory 402 to implement various functions, based on steps of: in response to a first operation on a first control, displaying a second control; receiving a second operation on the second control, and determining, based on a position of the second control, target information corresponding to the second operation; and setting the target information as input information.

In some embodiments, the processor 401 may specifically perform operations of: moving the second control and obtaining an end position of the second control in response to the second operation on the second control; and determining, based on the end position of the second control, the target information corresponding to the second operation.

In some embodiments, the processor 401 may specifically perform operations of: determining a target dwell region of the second control based on the end position; and selecting, based on a mapping relationship between a predetermined dwell region and predetermined information, information corresponding to the target dwell region as the target information.

In some embodiments, the processor 401 may specifically perform, subsequent to the selecting the information corresponding to the target dwell region as the target information, operations of: determining, based on a mapping relationship between the predetermined information and an information display form, an information display form corresponding to the target information as a target information display form; and displaying the target information based on the target information display form.

In some embodiments, the information display form includes an image form, and the processor 401 may specifically perform, prior to the determining, based on the end position of the second control, the target information corresponding to the second operation, operations of: obtaining a candidate position of the second control in response to detecting a movement of the second control; obtaining, based on the candidate position, candidate information and a candidate image corresponding to the candidate information; displaying the candidate information in real time based on the candidate image; and in response to detecting that the movement of the second control is stopped, obtaining the end position of the second control.

In some embodiments, the processor 401 may specifically perform, subsequent to the target information being set as the input information, operation of displaying the input information on the first control based on the target information display form.

In some embodiments, the processor 401 may specifically perform operations of: obtaining a start position of the second control; adjusting a size of the candidate image based on the start position and the candidate position; and displaying the candidate information in real time based on the adjusted candidate image.

In some embodiments, the processor 401 may specifically perform operations of: obtaining a target movement direction of the second control; and selecting, based on a mapping relationship between a predetermined movement direction and a dwell region set, a dwell region set corresponding to the target movement direction as a target dwell region set. Further, the determining the target dwell region of the second control based on the end position includes: determining the target dwell region of the second control from the target dwell region set based on the end position.

In some embodiments, the processor 401 may specifically perform operations of: obtaining a touch position of a touch operation; and displaying the second control based on the touch position.

It can be seen from the above that, the electronic device according to the embodiments of the present disclosure is capable of displaying the second control in response to the first operation on the first control; receiving the second operation on the second control, and determining, based on the position of the second control, the target information corresponding to the second operation; and set the target information as the input information. In the embodiments of the present disclosure, different information can be obtained based on the position change of the second control. Then, the target information is determined based on the end position of the second control, and is set as the input information. Therefore, the information can be flexibly processed.

Figure 11:
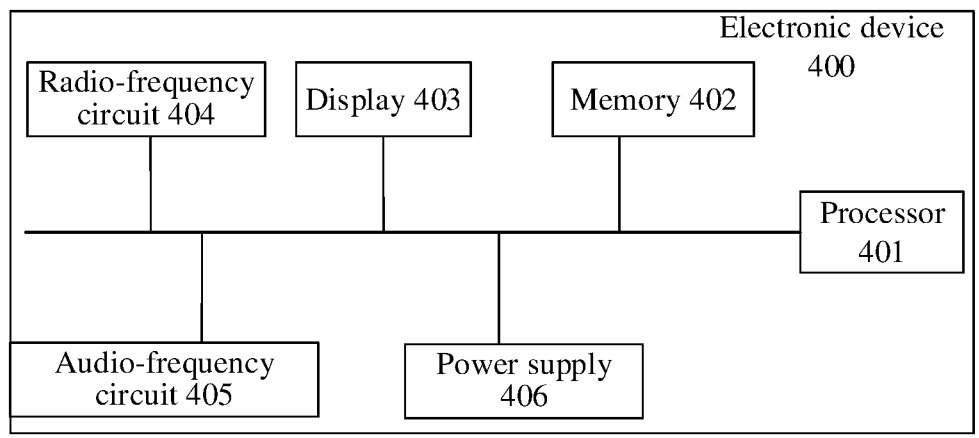
FIG. 11 is another schematic structural diagram of an electronic device according to an embodiment of the present disclosure.

Referring to FIG. 11 together, in some embodiments, the electronic device 400 may further include a displayer 403, a radio-frequency circuit 404, an audio-frequency circuit 405, and a power supply 406. The displayer 403, the radio-frequency circuit 404, the audio-frequency circuit 405, and the power supply 406 are electrically connected to the processor 401, respectively.

The displayer 403 may be configured to display information inputted by the user, information provided to the user, or various graphical user interfaces. These graphical user interfaces may be composed of graphics, text, icons, video, and any combination thereof. The displayer 403 may include a display panel. In some embodiments, the display panel may be a Liquid Crystal Display (LCD), an Organic Light-Emitting Diode (OLED), or the like, for example.

The radio-frequency circuit 404 may be configured to receive and transmit a frequency signal to establish wireless communication with a network device or other electronic devices through the wireless communication, and transmit and receive signals with the network device or other electronic devices.

The audio-frequency circuit 405 may be configured to provide an audio interface between the user and the electronic device by a speaker and a microphone.

The power supply 406 may be configured to power each component of the electronic device 400. In some embodiments, the power supply 406 may be logically connected to the processor 401 by a power management system, to implement functions such as charging, discharging, and power consumption management by the power management system.

Although not illustrated, the electronic device 400 may further include a camera, a Bluetooth module, and the like, details of which will be omitted herein.

As used herein, the term "module" may be regarded as a software object executed on a computing system. Different components, modules, engines, and services described herein may be regarded as implementing objects on the computing system. However, the apparatus and method described herein are preferably implemented by the software. Of course, they may also be implemented on hardware, which are both within the scope of the present disclosure.

A storage medium is further provided according to embodiments of the present disclosure. The storage medium has a computer program stored thereon. The computer program, when executed on a computer, causes the computer to implement the information processing method according to any one of embodiment. For example, the computer program, when executed on a computer, causes the computer to perform operations of: in response to a first operation on a first control, displaying a second control; receiving a second operation on the second control, and determining, based on a position of the second control, target information corresponding to the second operation; and setting the target information as input information.

In the embodiments of the present disclosure, the storage medium may be a magnetic disk, a compact disc (CD), a Read Only Memory (ROM), a Random Access Memory (RAM), or the like.

In the above embodiments, the description of each embodiment has its own emphasis. For a part that is not described in detail in an embodiment, reference may be made to related descriptions in other embodiments.

It should be noted that, for the information processing method according to the embodiments of the present disclosure, a person of ordinary skill in the art may understand that all or part of the flowchart of the information processing method according to the embodiments of the present disclosure may be implemented by using the computer program to control related hardware. The computer program may be stored in a computer-readable storage medium. For example, the computer program may be stored in the memory of the electronic device, executed by at least one processor of the electronic device, and include the flowchart of the information processing method during the execution. The storage medium may be the magnetic disk, the CD, the ROM, the RAM, or the like.

For the information processing apparatus according to the embodiments of the present disclosure, each function module thereof may be integrated in a processing chip, or each module may be separate physical existence, or two or more modules are integrated in one module. The integrated module may be embodied in a form of hardware or software function module. When the integrated module is embodied in the form of software function module and is sold or used as a standalone product, the integrated module may be stored in the computer readable storage medium. For example, the storage medium may be a read-only memory, the magnetic disk, the CD, or the like.

Detailed description of the information processing method and apparatus, the storage medium, and the electronic device according to the embodiments of the present disclosure have been described above. Specific examples are used herein to illustrate the principles and implementations of the present disclosure. The description of the above embodiments is only used to facilitate understanding of the method of the present disclosure and a core idea thereof. Meanwhile, for those skilled in the art, according to the concept of the present disclosure, changes can be made to the specific implementations and the application. Thus, the disclosed contents of the specification should not be construed as a limitation to the present disclosure.

What is claimed is:

1. An information processing method, comprising:
displaying a second control in response to a first operation on a first control displayed on an interaction page;
receiving a second operation on the second control, and determining, based on a position of the second control, target information corresponding to the second operation, wherein the target information differs based on a position change of the second control;
determining an information display form corresponding to the target information as a target information display form based on a predetermined mapping relationship between the target information and the information display form;
setting the target information as input information; and
replacing a display form of the first control with the determined target information display form corresponding to the input information, wherein the input information is used to express an opinion on the interaction page.

2. The information processing method according to claim 1, wherein said determining, based on the position of the second control, the target information corresponding to the second operation comprises:
in response to the second operation on the second control, moving the second control and obtaining an end position of the second control; and
determining, based on the end position of the second control, the target information corresponding to the second operation.

3. The information processing method according to claim 2, wherein said determining, based on the end position of the second control, the target information corresponding to the second operation comprises:
determining a target dwell region of the second control based on the end position; and
selecting, based on a mapping relationship between a predetermined dwell region and predetermined information, information corresponding to the target dwell region as the target information.

4. The information processing method according to claim 3, further comprising, subsequent to said determining the information display form corresponding to the target information as the target information display form based on the predetermined mapping relationship between the target information and the information display form:

displaying the target information based on the target information display form.

5. The information processing method according to claim 3, wherein the information display form comprises an image form, and the information processing method further comprises, prior to said determining, based on the end position of the second control, the target information corresponding to the second operation:
obtaining a candidate position of the second control in response to a movement of the second control being detected;
obtaining, based on the candidate position, candidate information and a candidate image corresponding to the candidate information;
displaying the candidate information in real time based on the candidate image; and
obtaining the end position of the second control in response to detecting that the movement of the second control being stopped.

6. The information processing method according to claim 5, wherein said displaying the candidate information in real time based on the candidate image comprises:
obtaining a start position of the second control;
adjusting a size of the candidate image based on the start position and the candidate position; and
displaying the candidate information in real time based on the adjusted candidate image.

7. The information processing method according to claim 3, further comprising:
obtaining a target movement direction of the second control; and
selecting, based on a mapping relationship between a predetermined movement direction and a dwell region set, the dwell region set corresponding to the target movement direction as a target dwell region set.

8. The information processing method according to claim 7, wherein said determining the target dwell region of the second control based on the end position comprises:
determining the target dwell region of the second control from the target dwell region set based on the end position.

9. The information processing method according to claim 1, wherein:
the first operation comprises a touch operation; and
said displaying the second control in response to the first operation on the first control comprises:
obtaining a touch position of the touch operation; and
displaying the second control based on the touch position.

10. A storage medium, having a computer program stored thereon, wherein the computer program, when executed on a computer, causes the computer to:
display a second control in response to a first operation on a first control displayed on an interaction page;
receive a second operation on the second control, and determine, based on a position of the second control, target information corresponding to the second operation, wherein the target information differs based on a position change of the second control;
determine an information display form corresponding to the target information as a target information display form based on a predetermined mapping relationship between the target information and the information display form;
set the target information as input information; and
replace a display form of the first control with the determined target information display form corresponding to the input information, wherein the input information is used to express an opinion on the interaction page.

11. The storage medium according to claim 10, wherein said determining, based on the position of the second control, the target information corresponding to the second operation comprises:
in response to the second operation on the second control, moving the second control and obtaining an end position of the second control; and
determining, based on the end position of the second control, the target information corresponding to the second operation.

12. An electronic device, comprising:
a processor; and
a memory having a computer program stored thereon,
wherein the processor is configured to invoke the computer program to:
display a second control in response to a first operation on a first control displayed on an interaction page;
receive a second operation on the second control, and determine, based on a position of the second control, target information corresponding to the second operation, wherein the target information differs based on a position change of the second control;
determine an information display form corresponding to the target information as a target information display form based on a predetermined mapping relationship between the target information and the information display form;
set the target information as input information; and
replace a display form of the first control with the determined target information display form corresponding to the input information, wherein the input information is used to express an opinion on the interaction page.

13. The electronic device according to claim 12, wherein the processor is configured to determine, based on the position of the second control, the target information corresponding to the second operation by performing operations of:
moving the second control and obtaining an end position of the second control in response to the second operation on the second control; and
determining, based on the end position of the second control, the target information corresponding to the second operation.

14. The electronic device according to claim 13, wherein the processor is configured to determine, based on the end position of the second control, the target information corresponding to the second operation by performing operations of:
determining a target dwell region of the second control based on the end position; and
selecting, based on a mapping relationship between a predetermined dwell region and predetermined information, information corresponding to the target dwell region as the target information.

15. The electronic device according to claim 14, wherein the processor is further configured to perform, subsequent to said determining the information display form corresponding to the target information as the target information display form based on the predetermined mapping relationship between the target information and the information display form, operations of:
displaying the target information based on the target information display form.

16. The electronic device according to claim 14, wherein:
the information display form comprises an image form; and
the processor is further configured to perform, prior to said determining, based on the end position of the second control, the target information corresponding to the second operation, operations of:
obtaining a candidate position of the second control in response to a movement of the second control being detected;
obtaining, based on the candidate position, candidate information and a candidate image corresponding to the candidate information;
displaying the candidate information in real time based on the candidate image; and
obtaining the end position of the second control in response to detecting that the movement of the second control being stopped.

17. The electronic device according to claim 16, wherein the processor is configured to display the candidate information in real time based on the candidate image by performing operations of:
obtaining a start position of the second control;
adjusting a size of the candidate image based on the start position and the candidate position; and
displaying the candidate information in real time based on the adjusted candidate image.

18. The electronic device according to claim 14, wherein the processor is further configured to perform operations of:
obtaining a target movement direction of the second control; and
selecting, based on a mapping relationship between a predetermined movement direction and a dwell region set, the dwell region set corresponding to the target movement direction as a target dwell region set.

19. The electronic device according to claim 18, wherein the processor is configured to determine the target dwell region of the second control based on the end position by performing an operation of:
determining the target dwell region of the second control from the target dwell region set based on the end position.

20. The electronic device according to claim 12, wherein:
the first operation comprises a touch operation; and
the processor is further configured to display the second control in response to the first operation on the first control by performing operations of:
obtaining a touch position of the touch operation; and
displaying the second control based on the touch position.

* * * * *